United States Patent
Agar et al.

[11] Patent Number: 5,321,427
[45] Date of Patent: Jun. 14, 1994

[54] PRINT HEAD MODULATOR

[75] Inventors: Keith W. Agar, Henrietta; Gerald M. Brown, Pittsford, both of N.Y.

[73] Assignee: Eastman Kodak Company, Rochester, N.Y.

[21] Appl. No.: 891,874

[22] Filed: Jun. 3, 1992

[51] Int. Cl.$^5$ .............................................. B41J 2/355
[52] U.S. Cl. .................................. 346/76 PH; 346/1.1
[58] Field of Search .......................... 346/1.1, 76 PH; 400/120

[56] References Cited

U.S. PATENT DOCUMENTS

| | | | |
|---|---|---|---|
| 4,443,121 | 4/1984 | Arai | 346/76 PH |
| 4,532,523 | 7/1985 | Tanaka | 346/76 |
| 4,596,993 | 6/1986 | Erlichman | 346/76 PH |
| 4,611,246 | 9/1986 | Nihei | 358/256 |
| 4,710,787 | 12/1987 | Caine et al. | 346/76 |
| 4,745,413 | 5/1988 | Brownstein et al. | 346/76 |
| 4,774,528 | 9/1988 | Kato | 346/76 PH |
| 4,782,398 | 11/1988 | Mita | 358/280 |
| 4,870,499 | 9/1989 | Suzuki | 358/443 |
| 4,912,562 | 3/1990 | Fenster et al. | 358/298 |
| 4,951,152 | 8/1990 | Suzuki et al. | 346/76 PH |
| 4,980,702 | 12/1990 | Kneezel et al. | 346/140 |
| 4,994,822 | 2/1991 | Caine | 346/76 |

FOREIGN PATENT DOCUMENTS

2204976A 11/1988 United Kingdom .

Primary Examiner—Benjamin R. Fuller
Assistant Examiner—N. Le
Attorney, Agent, or Firm—Thomas H. Close

[57] ABSTRACT

A thermal print head modulator (300) for generating modulation signals for printing a halftone dot (145) whose size corresponds to a data value (205) represented by a plurality of bits. The modulator (300) includes a programmable look-up table (235) containing modulation values (236) that are selectable by control circuitry (245). By storing modulation values (236) in a pre-determined pattern and selecting each value sequentially for comparison with each data value (205), the modulator (300) is compatible with both pulse count modulation and partial pulse modulation having any number of designated partial pulse bits in the data value (205).

14 Claims, 4 Drawing Sheets

PRINT HEAD MODULATOR

TECHNICAL FIELD OF THE INVENTION

The invention relates to methods and apparatus for accomplishing ink-transfer thermal printing, and particularly, to a method and apparatus for modulating a print head in such a thermal printing system.

BACKGROUND ART

Generally, an image printed by a thermal printing system consists of rows of dots. Together, the size of individual dots and proximity of each dot to another generate the tone of a thermally printed image. By judiciously positioning and sizing such dots on a recording medium and, consequently, controlling the image tone, a thermal printer can produce high quality images including printed characters, diagrams, pictures, and the like.

To generate printed dots, a thermal printing system employs a print head modulator and thermal printing apparatus. The modulator creates signals that cause the printing apparatus to physically print the dots upon a recording medium such as paper. In particular, the print head modulator interprets a series of data values, each of which defines the size of a dot, and then generates a modulation signal corresponding to each data value. The modulation signal controls the printing printed on the recording medium.

As is well known in the art, a typical thermal printing apparatus comprises a thermal print head, an assembly for incrementally advancing a recording medium past the head after each row of dots is printed, and an ink film disposed between the print head and the recording medium. Generally, the thermal print head contains a number of thermal head elements arranged in a linear fashion. Each of these thermal elements is individually activated by an electric current. The current, in turn, causes the activated thermal element to heat and thereby melt ink located on the ink film at a position adjacent to that thermal element. As such, melted ink transfers to the recording medium to form a line of dots where each dot in the line is associated with an activated element in the print head. Subsequently, the recording medium and the ink film are incrementally moved by a roller; thereafter, another line of dots is printed, and so on. The process is repeated until a complete image is printed on the recording medium.

The modulator controls which thermal elements within the print head are active and the amount of heat each thermal element generates. The size of each dot is proportional to the amount of heat produced by that thermal element when printing that dot. As an increasing amount of heat is generated, correspondingly increasing amounts of ink melt, producing proportionally larger dots.

The art teaches two forms of print head modulators: analog and digital. In conventional analog print head modulators, analog circuitry is used to control the magnitude of the heating current applied to each thermal element. Hence, the magnitude of the heating current controls the heat produced by a given head element and, consequently, the size of the printed dot.

In contrast, digital print head modulators, such as that disclosed in U.S. Pat. No. 4,532,523 (issued to H. Tanaka on Jul. 30, 1985) uses pulse count modulation (PCM). In general, a PCM-based print head modulator selectively applies a fixed amplitude current to each thermal element. To control the dot size, a fixed duration digital modulation signal (i.e., a current pulse) is repeatedly applied to a print head driver circuit. This circuit alternately switches current, which flows through a thermal element, on and off in response to the modulation signal. By repeatedly applying the current pulses for successive durations, the thermal element becomes progressively warmer with each such pulse. This, in turn, causes an increasingly larger amount of ink to be transferred to the recording medium and, hence, produces an increasingly larger dot.

In general, a PCM-based print head modulator converts a series of data values into a series of modulation signals. Each data value represents a dot size. The series of modulation signals are, in turn, applied to the thermal elements via print head driver circuitry. By applying heating current to a number of thermal elements in the print head, a line of dots is printed. Each printed dot is sized commensurate with the value of a corresponding data value. For example, if a data value uses 8 bits to define the size of a dot, the associated modulator can produce modulation signals corresponding to 256 dot sizes ranging from 0 to 255. Each dot size corresponds to a dot density level, also known as a gray scale level.

In a PCM-based print head modulator, the data value for a given dot is successively compared to a series of modulation values in order to produce modulation signals corresponding to each dot. The resulting series of comparisons determines the number of fixed duration pulses that must be applied to a thermal element to generate a desired dot size. Through the use of a simple form of PCM, a modulator directly compares a given data value to each one of a series of modulation values ranging from 0 to $(2^n-2)$. Whenever the data value is larger than a modulation value, a logical "1" is generated as a modulation signal. Thereafter, a current pulse of fixed duration is applied to an appropriate thermal element for each modulation signal having a logical "1" value. Since the modulation values linearly increase in value, as the data value increases, so will the number of current pulses that are applied to the thermal element. Consequently, the printed dot size will also increase as a result of an increase in the data value.

A complete thermally printed image is produced by repeating the modulation value comparisons for every data value representing an image and applying the resultant modulation signals to the printing apparatus. Unfortunately, since each data value must be compared to each of $2^n-1$ modulation levels, a relatively long processing time is required to generate a complete halftone image. Owing to the large number of comparisons, PCM based thermal printers generally print at quite a slow pace.

To reduce the number of comparisons required to generate each dot, and thereby increase the print speed of each line of dots, a technique known as partial pulse modulation (also referred to as "modified PCM") has been developed in the art. Specifically, U.S. Pat. No. 4,994,822 (issued to H. Caine on Feb. 19, 1991—hereinafter referred to as the Caine '822 patent), discloses a partial pulse technique in which modulating pulses of various widths are used, in lieu of fixed width pulses, to achieve each gray scale level.

Generally, a partial pulse modulator generates a series of modulation signals for each data value. The modulation signals cause the print head driver circuitry to successively apply a series of full duration current pulses (one unit in duration) plus a number of partial duration current pulses (fraction of a unit) to a thermal element. The combination of full and partial current pulses applied to such an element defines the size of a printed dot generated by that thermal element.

Specifically, a partial pulse modulator designates a number of bits within a data value as so-called "partial pulse" bits. Typically, the partial pulse bits are one or more of the least significant bits of a data value. The bits not designated as partial pulse bits are known as PCM bits. The partial pulse modulator generates the full and partial current pulses by separately operating on the PCM and partial pulse bits.

In this regard, the Caine '822 patent teaches the use of three least significant bits of a 9-bit data value as partial pulse bits. These partial pulse bits are separated from each data value. The remaining 6 most significant bits are used as PCM bits and are compared to each of 63 modulation values, i.e., $2^6-1$ values. As in conventional PCM, whenever a 6-bit data value is larger than a selected 6-bit modulation value, a fixed duration pulse is applied to a thermal element associated with the data value currently being processed. The pulse duration, or pulse width, is fixed to a one unit length.

Subsequent to processing the PCM bits, the three partial pulse bits in the data value are processed individually by dedicated circuitry. In particular, the three partial pulse bits are categorized as being in positions 0, 1, or 2 corresponding to the first, second, or third least significant bit positions in the data value. Whenever a logical "1" appears in position 0, 1, or 2, a pulse $\frac{1}{8}$, $\frac{1}{4}$, or $\frac{1}{2}$ the duration of the one unit pulse, respectively, is applied to the same thermal element to which the fixed duration current pulses were previously applied. In essence, the PCM bits apply integer value pulse durations to the thermal elements, while the partial pulse bits apply fractional duration pulses to the same thermal elements. Therefore, for a modulator capable of handling a 9-bit data value, 512 gray levels are achieved using only 63 modulation value comparisons. In contrast, conventional PCM would require 511 such comparisons. Since the same gray scale print is produced with far fewer comparisons, a significant increase in printing speed results with the use of modified PCM.

The minimum duration corresponding to a partial pulse bit, i.e., the pulse duration increment corresponding to each gray scale level, is limited by the minimum heat needed to generate a detectable incremental change in the size of a resulting dot. In practice, the minimum pulse width must be sufficiently long to sufficiently heat the thermal element to print a dot, while the maximum pulse width must be sufficiently short not to saturate the recording medium with ink or damage the thermal element through thermal breakdown. Each thermal print head has a thermal efficiency characteristic; this characteristic being defined as a ratio of an incremental change in thermal element drive current to the resulting change in heat so generated. The minimum pulse width is defined by both the least amount of heat necessary to melt the ink and the thermal efficiency of a thermal element. Therefore, the thermal print heads and their associated modulators must be designed sequentially, i.e., thermal element characteristics such as thermal efficiency and saturation define the minimum and maximum pulse lengths that are to be produced by the modulator, and consequently, the maximum number of partial pulse bits.

Currently, to achieve a marked improvement in printing speed by using partial pulse modulation, the modulator circuitry is designed to accommodate a specific number of partial pulse bits. Detrimentally, a different modulator design is required for each combination of data value bits and partial pulse bits. A single modulator design that can be used with any number of partial pulse bits, or none at all, is desirable to eliminate the need for a number of different modulator designs. In other words, a generic modulator is needed. Up to now, no such generic modulator exists in the art.

Therefore, a need exists in the art for a modulator useful in a thermal printing system that generates halftone images using either partial pulse modulation or pulse count modulation. Additionally, the modulator must be relatively simple and capable of accommodating any number of partial pulse bits.

SUMMARY OF THE INVENTION

The deficiencies associated with thermal print head modulators known in the art are advantageously eliminated through my invention. Specifically, in accordance with the teachings of the present invention, a programmable look-up table containing modulation values is incorporated into a thermal print head modulator. The look-up table can be programmed with any number of modulation values up to the number necessary to accomplish pulse count modulation. Thus, when pulse count modulation is desired, each modulation value is selected from the table, by a control circuit, for comparison to each data value. The result of each comparison is used as a modulation signal to drive a thermal print head for a fixed duration. However, when the modulator is to be used as a partial pulse modulator, the capability to program the modulation values into the table enables the modulator to use a select number of modulation values for comparison to PCM bits within each data value. The result of the PCM bit comparison generates a modulation signal for driving the print head with full duration current pulses, while a number of partial pulse bits are separately used as modulation signals for generating partial duration current pulses. Therefore, the modulator can be used, without alteration, with any number of partial pulse bits, or none at all.

BRIEF DESCRIPTION OF THE DRAWINGS

The teachings of the present invention may be readily understood by considering the following detailed description in conjunction with the accompanying drawings, in which.

To facilitate understanding, identical reference numerals have been used, where possible, to denote identical elements that are common to various figures.

DETAILED DESCRIPTION OF THE INVENTION

Figure 1:
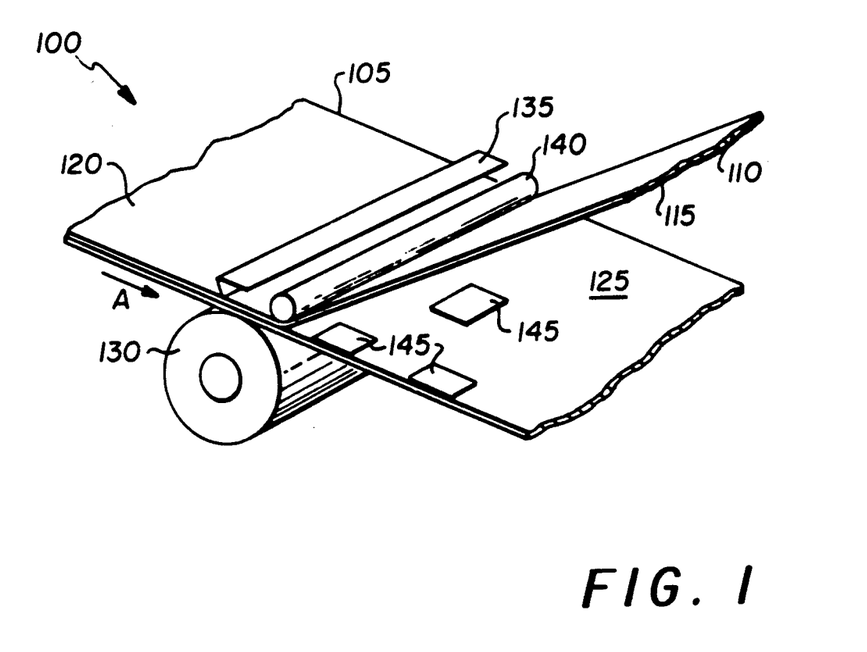
FIG. 1 depicts a general perspective view of a portion of a thermal printing system which prints halftone dots in response to modulation signals from a print head modulator according to the teachings of the present invention.

FIG. 1 depicts a portion of thermal printing system 100 that physically prints dots onto a recording medium. Generally, system 100 comprises thermal print head 135, recording medium 125, and ink film 105 disposed between the recording medium and thermal print head. In operation, modulator 300, in cooperation with print head driver circuitry (not specifically shown), produces modulation signals for printing halftone dot 145. The size of the dot corresponds to a data value represented by a plurality of bits. Modulator 300 includes a programmable look-up table containing modulation values that are selectable by control circuitry. By storing modulation values in a pre-determined pattern and selecting each value for comparison with each data value, modulator 300 can produce either pulse count modulation or partial pulse modulation. The modulation signals are applied to thermal elements within thermal print head 135 such that appropriate amounts of ink on ink film 105 are transferred to recording medium 125 to form properly sized dots 145.

Specifically, ink film 105, acting as an ink transfer intermediary, consists of polyester film 110 having an ink coating on surface 115 and no such coating on surface 120. The ink, which is well known in the art, melts when a hot thermal element is placed proximate to uncoated surface 120 of ink film 105. Recording medium 125, such as paper, is transported through system 100 by roller 130 in a direction indicated by arrow A. Roller 130 also ensures that recording medium 125 remains in contact with ink coated surface 115 while both the recording medium and ink film are under print head 135. The print head, positioned opposite to roller 130, contacts uncoated surface 120 of ink film 105. After passing under the thermal print head, ink film 105 is separated from recording medium 125 and guided, via guide roller 140, to a take-up reel (not shown).

Thermal print head 135 extends along the width ink film 105 and is oriented substantially transverse to the direction of travel of the recording medium. The thermal print head comprises a number (k) of thermal elements, i.e., thin film resistive heating elements (not shown), mounted in an evenly spaced, linear arrangement on a ceramic substrate. Typically, adjacent thermal elements are spaced approximately 100 $\mu$m from each other. The number of such thermal elements defines the maximum number of dots on a printed line. For example, if 512 dots are to be printed on one line, 512 thermal elements are necessary.

In operation, each individual thermal element is selectively heated by passing electric heating current therethrough. As the temperature of the thermal element reaches the melting point of the ink, the ink begins to melt in a location proximate to that element. As the temperature increases, the amount of ink that melts correspondingly increases. As the ink melts, ink transfers to the surface of recording medium 135 that abuts adjacent ink film 105 to form dots 145—which, for purposes of illustration, are shown grossly exaggerated in size.

One line of dots is printed at a time. Once the ink is transferred to recording medium 125 for one line of dots, the recording medium and the ink film are both incrementally advanced in a direction shown by arrow A. Subsequently, the next line of dots 145 is printed on recording medium 125 and so on. If the dots are sufficiently small, then successive rows of dots 145 are spatially integrated by a human eye and, hence, collectively perceived as a continuous tone image.

Figure 2:
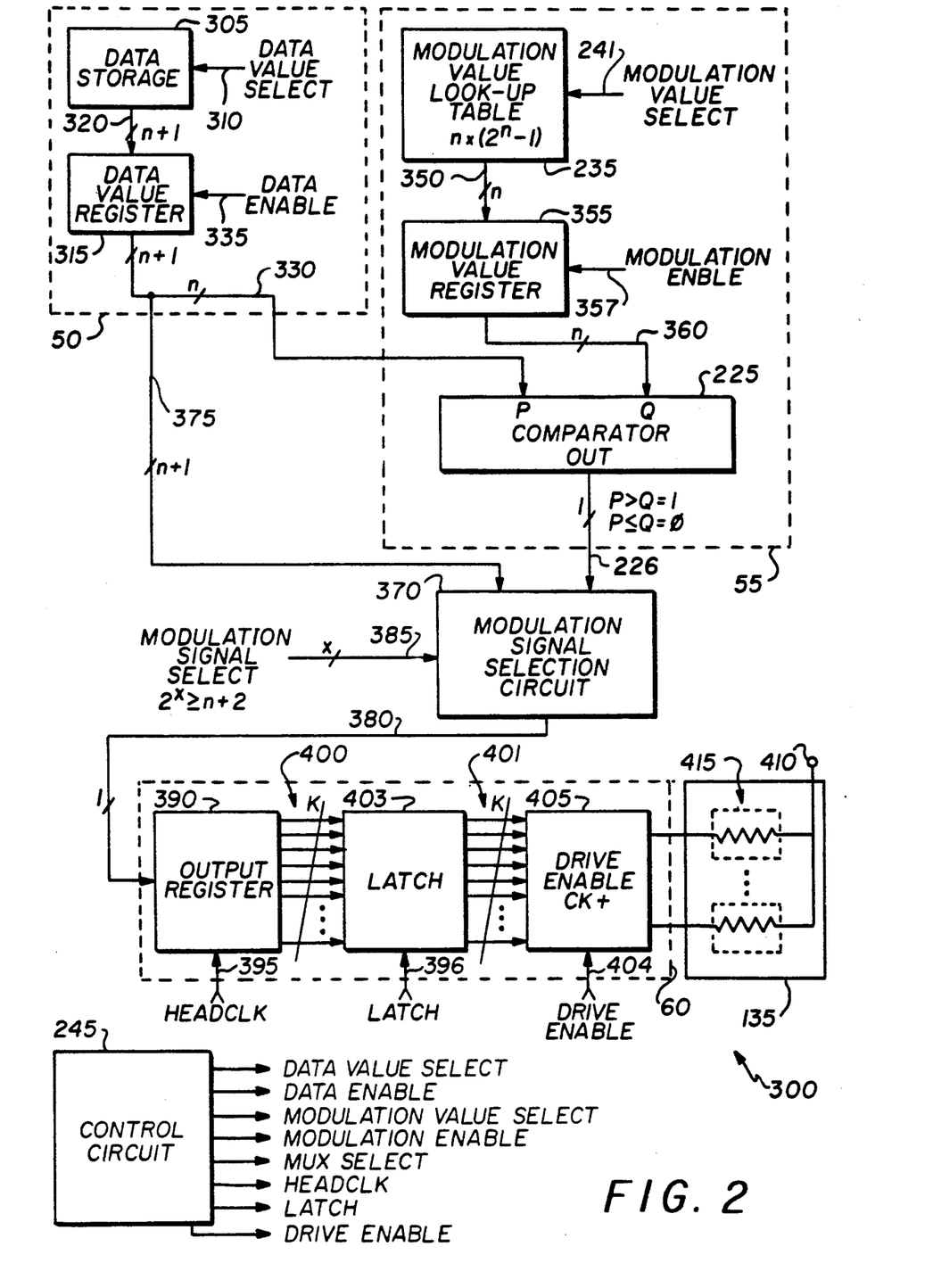
FIG. 2 depicts a block diagram of an embodiment of inventive modulator 300.

FIG. 2 depicts a detailed block diagram of print head modulator 300 used in accordance with the teachings of the invention to apply current to thermal elements 415 of print head 135. Generally, modulator 300 converts a series of digital data values, each data value representing a dot size, into a series of modulation signals. If modulator 300 is used to generate conventional pulse count modulation (PCM), then data values stored in data value source 50 are converted into full duration modulation signals. However, if modulator 300 is used to generate partial pulse modulation, then these data values are converted into both full duration modulation signals and partial duration modulation signals. Modulation signal selection circuit 370 selects whether partial or full duration modulation signals will be used to modulate thermal elements 415 via print head driver circuit 60.

By way of an overview, full duration modulation signal generator 55 comprises look-up table 235, modulation value register 355, and comparator 225. In accordance with one aspect of the invention, programmable look-up table 235 contains modulation values that are stored in a pre-determined pattern. Thus, when pulse count modulation is desired, look-up table 235 is programmed to contain all the modulation values necessary to accomplish pulse count modulation. Thereafter, each and every modulation value is selected from the table for comparison to each data value. The result of each comparison is a full duration modulation signal. The full duration modulation signal controls the application of a fixed duration current pulse to thermal print head 135. However and as described in much greater detail later, when modulator 300 is to be used as a partial pulse modulator, a select number of modulation values are stored in a predetermined pattern in table 235 and, subsequently, each value is selected by control circuit 245. Each selected modulation value is compared to PCM bits within each data value. The result of each comparison is a full duration modulation signal. The full duration modulation signal controls the application of a fixed, full duration current pulse to thermal print head 135, while a number of partial pulse bits are separately used as partial duration modulation signals for generating partial duration current pulses. Therefore, modulator 300 can be used, without significant alteration, with any number of partial pulse bits, or none at all.

Having discussed an overview of the main components of the inventive print head modulator and its interaction with printing apparatus, I will now turn to separately addressing, in detail, the operation of the inventive modulator, first, for producing conventional pulse count modulation and, second, for producing partial pulse modulation.

CONVENTIONAL PULSE COUNT MODULATION

As is well known in the art, to generate conventional PCM, each data value is compared to a series of modulation values. Whenever a data value is larger than a modulation value, a modulation signal representing a full duration current pulse is produced. In the preferred embodiment of the invention, this comparison is accomplished by full duration modulation signal generator 55.

Now, referring to the detail of FIG. 2, data value source 50 comprises data storage device 305 and data value register 315. Data storage device 305, typically a random access memory (RAM) integrated circuit, provides temporary storage of one or two rows of data values which represent one or two lines of printed dots. Generally, these rows form a retrieved portion of an image previously stored in an external mass memory (not shown), such as a disk drive. Alternatively, the data values may be collected in device 305 directly from a digitizing scanner that can be used to digitize pages of text, photographs, or the like.

Each data value has a length of n+1 bits. Of course, the data value can be of any length greater than n-bits, when n represents the number of bits in each modulation value. For purposes of illustration, the preferred embodiment is depicted as having data values each of which is n+1 bit lengths wide. The versatility of having a data value n or more bits long will become apparent from the discussion below.

Generally, a data value is selected from data storage device 305 and transferred, via data value register 315, to comparator 225. Specifically, a "DATA VALUE SELECT" command from control circuit 245 on select line 310 selects a data value for processing. The data value is transferred, via lines 320, to data value register 315. Only n-bits of the data value are subsequently transferred, via n data lines 330, to input port P of comparator 225 upon the occurrence, on line 335, of the "DATA ENABLE" command. The full n+1 bits of data value are transferred, via n+1 data lines 375, to modulation signal selection circuit 370.

Simultaneous with the data value selection, a modulation value of n-bit width is selected from RAM-based look-up table 235. Typically, look-up table 235 contains empirically determined values. Each modulation value is selected by a "MODULATION VALUE SELECT" command on line 241 originating from control circuit 245. The selected modulation value is transferred, via lines 350, to modulation value register 355. Subsequently, upon occurrence of a "MODULATION ENABLE" command on line 357, the modulation value is transferred, via lines 360, to input port Q of comparator 225. Comparator 225 outputs, as a full duration modulation signal, a logical "1" whenever the data value at port P is larger than the modulation value at port Q; otherwise, the output value is a logical "0".

Figure 3:
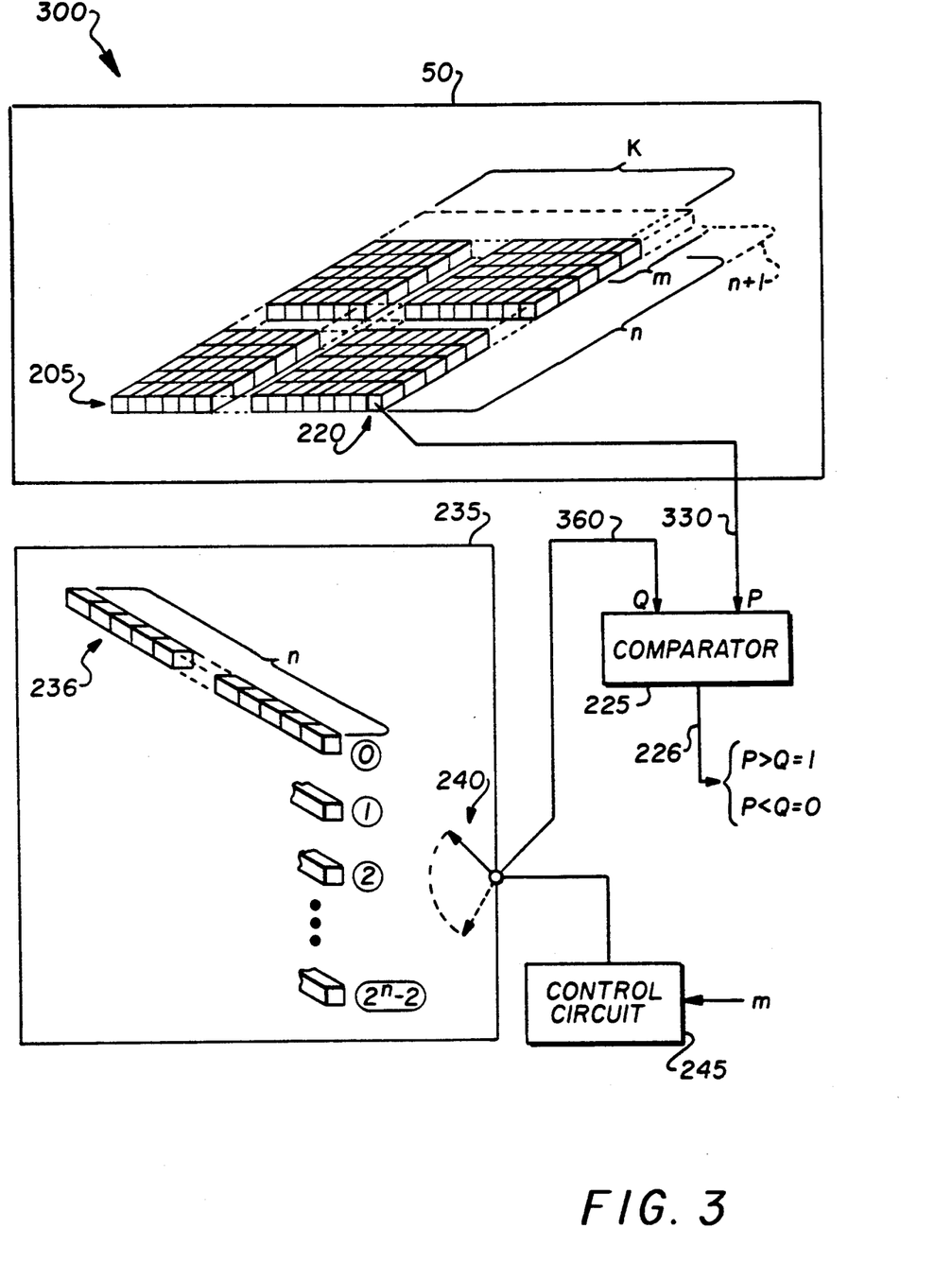
FIG. 3 depicts a block diagram of a portion of inventive modulator 300 that performs a data value and modulation value comparison according to the teachings of the invention.

To aid in understanding the comparison process, FIG. 3 depicts a simplified block diagram of a portion of modulator 300 that accomplishes the data value comparisons in accordance with the teachings of the invention. As discussed previously, modulator 300 includes look-up table 235 containing modulation values 236, data value source 50, control circuit 245, and comparator 225. To simplify the explanation, modulation value register 357 shown in FIG. 2 is disregarded.

In operation, each data value 205 in data value source 50 is compared to each modulation value 236. Each such modulation value is selected, by control circuit 245, from look-up table 235. In accordance with the invention, the particular modulation values stored in look-up table 235 are typically programmed into the table by software during printer set-up and initialization.

Each line of data values 205 contains k data values each having n+1 bits. Correspondingly, there are a total of k thermal elements which comprise the print head. Each of the k data values 205 corresponds to each of the k thermal elements. In operation, specific data value 220 is selected from line of data values 205 and is transferred, along line 330, to input port P of comparator 225. Simultaneously, look-up table 235 is accessed by stack pointer 240 to select a modulation value. For simplicity, modulation values 236 are assumed to be linearly progressive numbers ranging from 0 to $2^n-2$ in increments of 1. However, the modulation values could be of any value indexed by addresses ranging from 0 to $2^n-2$.

Once control circuit 245 selects through stack pointer 240, a particular modulation value from table 235 for comparison to selected data value 220, the selected modulation value is transferred to line 360 and from there, to input port Q of comparator 225. Comparator 225 outputs a logical "1" whenever data value 220, at input port P, is larger than the modulation value 236, at input port Q; otherwise, the output value is logical "0". Output 226 of comparator 225 is a full duration modulation signal.

Referring back to FIG. 2, to facilitate use of conventional PCM, modulation signal selection circuit 370 connects its output solely to line 226, i.e., the full duration modulation signal. Thus, as each data value in the stored line of data values is successively compared to the first modulation value in table 235, the resultant full duration modulation signals, i.e., appearing at output 226 of comparator 225, are sent, along line 380 to print head driver circuit 60.

Print head driver circuit 60 comprises output register 390, latch 403, and drive enable circuit 405. As modulation signal selection circuit 370 supplies full duration modulation signals on line 380, output register 390 fills with the modulation signals representing the comparison results. Output register 390, a shift register, stores k full duration modulation signals, i.e., one full duration modulation signal for each data value comparison. Upon each occurrence of a "HEADCLK" signal on line 395, the modulation signal on line 380 is transferred into register 390 until k full duration modulation signals are stored therein. Upon the occurrence of a "LATCH" command on line 396, latch 403 transfers, via lines 400 and 401, the contents of register 390 to drive enable circuit 405. Subsequently, the modulation signals from latch 403 are applied to thermal elements 415, via drive enable circuitry 405, for a duration controlled by a "DRIVE ENABLE" command on line 404. When a modulation signal bit of logical value "1" and the "DRIVE ENABLE" command are coincident to drive enable circuit 405, a current will flow from positive voltage terminal 410 through thermal element 415 to ground for a fixed duration equivalent to the pulse length of the "DRIVE ENABLE" command. During the period of current flow through thermal element 415, this element becomes hot and melts the ink on the ink film (not shown) to form a dot on the recording medium.

Subsequently, each data value is compared to a second modulation value in table 235. The outcome of the data value comparisons cause thermal elements having associated full duration modulation signals of logical "1" to heat for a fixed duration. Thereafter, each data value is compared to a third modulation value in table 235, and so on, until all of the data values representing a line of print have been compared to all the modulation values in look-up table 235. After each comparison, whenever a full duration modulation signal has a value of logical "1", a full duration pulse is applied to a thermal element to print a dot. The process repeats until all the comparisons are complete and a line of dots is printed. Thereafter, the recording medium is incrementally advanced and the process repeats for the next line of dots and so on until a complete image is printed.

Thus, inventive print head modulator 300 is capable of generating conventional PCM. However, as is typical of conventional PCM, many data value comparisons are necessary to print a single line of dots. For example, in a modulator using 8-bit data values, the PCM generation process requires 255 comparisons to generate a single dot capable of being one of 256 dot sizes, i.e., effectively implementing a so-called 256 level gray scale PCM modulator. Assuming that 1024 dots are printed to generate one line of print, i.e., k=1024, the modulator must accomplish 261,120 comparisons per line of print.

PARTIAL PULSE MODULATION

In some printing systems, to reduce the number of comparisons necessary to generate 256 or more levels of gray scale, one or more of the data value bits are deemed by the modulator as partial pulse bits. In theory, the number of partial pulse bits may range from 0 to n+1, i.e., from no partial pulse bits up to all of the data value bits. However, the actual number of partial pulse bits is constrained by thermal element characteristics such as thermal efficiency and saturation level. Modulator 300, discussed previously with respect to conventional PCM modulation, is easily adapted for partial pulse modulation by merely instructing control circuit 245 as to the number of partial pulse bits desired and storing an appropriate number of modulation values in modulation value look-up table 235. Typically, a keypad or switch arrangement would be used during printer manufacture to instruct control circuit 245 as to the number of partial pulse bits to use in a particular application. Hereinafter, the number of partial pulse bits is designated by the variable m.

As is well known in the art, partial pulse modulation uses: (a) the partial pulse bits to directly generate partial duration modulation signals and (b) the PCM bits (non-partial pulse bits) to generate full duration modulation signals. The result of this bifurcated process is an n level gray scale using only $2^{n-m}-1$ comparison steps.

Now, once again referring to FIG. 3, partial pulse bits are allocated to one or more of the least significant bits in each data value 205. In other words, if each data value illustratively contained eight data value bits having numbered positions 0, 1, 2, 3, 4, 5, 6, and 7, for a printing system using three partial pulse bits, the partial pulse bits are illustratively bits in positions 0, 1, and 2. Clearly, the partial pulse bits can be allocated to any other position within the data value.

Each partial pulse bit is used as a partial duration modulation signal to directly modulate thermal elements 415 (see FIG. 2). Accordingly, if m partial bits are used with z representing the bit position of the least significant bit, then the current pulse duration applied to a thermal element corresponding to a given partial pulse bit is $1/(2^{m-z})$ times the pulse duration used to drive the thermal element for the non-partial pulse bits, i.e., the PCM bits. Thus, whenever a logical "1" appears in a given partial pulse bit position, modulator 300 generates a partial duration current pulse having a duration corresponding to the partial pulse bit position within the data value. In effect, n-m data value bits correspond to an integer value for the applied pulse duration with m, the partial bits, designating a fraction of the integer value. The smallest fractional increment is $1/(2^m)$.

Since the partial pulse bits are a portion of data value 205 (see FIG. 3), the partial pulse bits must be ignored during the PCM bit comparison process or output 226 from comparator 225 will be erroneous, i.e., extra current pulses will be applied to each thermal element than is warranted by the magnitude of the data values.

In the preferred embodiment of the invention, whenever modulator 300 is used to generate partial pulse modulation, a lesser number of modulation values 236 are stored in look-up table 235 where modulator 300 is used for conventional PCM. As discussed previously, when used as a conventional PCM modulator, all of the modulation values 236 in table 235 are selected sequentially by control circuit 245. Similarly, as a partial pulse modulator, modulation values 236 are also sequentially selected from table 235. However, modulation values 236 are programmed into table 235 in a predetermined pattern defined by the number of partial pulse bits. Accordingly, the number of partial pulse bits, m, is used to determine which modulation values are to be stored in table 235. Specifically, modulation values having logical "1" in locations within each modulation value 236 aligned with the partial pulse bit locations in data value 205 are stored in table 235. As discussed previously, the partial pulse bits are typically the least significant bits in data value 205; therefore, only modulation values having logical "1" as least significant bits are stored.

For example, if an 8-bit data value has two partial pulse bits located as the two least significant bits of a data value, table 235 is programmed to store for comparison all modulation values having the last two bits as logical "1". Accordingly, if the possible modulation values range from 0 to $2^n-2$ in increments of 1, the table stores and the control circuit sequentially selects values 3, 7, 11, 15, . . . , i.e., those values beginning with value $2^m-1$ and thereafter continuing with values in increments of $2^m$. Thus, comparison is made to $2^{(n-m)}-1$ modulation values, or 63 modulation values in this example. In comparison to conventional PCM, using two partial pulse bits saves 192 comparative processing iterations for each data value. As this example shows, modulator 300 can accommodate any number of partial pulse bits, m, or none at all (conventional PCM) by merely storing the appropriate modulation values corresponding to the number of partial pulse bits desired.

Once control circuit 245 selects a particular modulation value through stack pointer 240 from table 235 for comparison to selected data value 220, the selected modulation value is transferred to line 360 and from there, to input port Q of comparator 225. Comparator 225 outputs a logical "1" whenever data value 220, at input port P, is larger than the modulation value 236, at input port Q; otherwise, the output value is logical "0". Output 226 of comparator 225 is a full duration modulation signal.

Returning to FIG. 2, the full duration modulation signal is transferred, along line 226, to modulation signal selection circuit 370. Additionally, all n+1 output ports of data value register 315 are connected, via lines 375, to modulation signal selection circuit 370. Typically, modulation signal selection circuit 370 is a multiplexer having n+2 input ports and a single output port. All of the data value bits are provided as inputs to circuit 370; however, here only the partial pulse bits are ever selected as output signals for routing to line 380. All of the data value bits are carried to modulation signal selection circuit 370 to ensure that modulator 300 is versatile and can easily handle any number of partial pulse bits deemed necessary for a particular application.

A plurality of modulation signal select lines 385 are provided for selecting which input value is transferred to output line 380. The number of select lines must be greater than or equal to the number of input lines 226, 375, i.e., n+2. A "MODULATION SIGNAL SELECT" command, on line 385, selects which of the input signals to circuit 370 are to be used as modulation signals. The selected input, i.e., either one of the partial pulse bits on lines 375 or the comparison outcome on line 226, is transferred to line 380 when selected.

In some applications, modulation signal selection circuit 370 may only have a limited number of input ports. At a minimum though, modulation signal selection circuit 370 must accommodate all of the expected partial pulse bits and the bit from comparator 225, i.e., circuit 370 must have at least m+1 inputs. Hence, the corresponding minimum number of input lines to circuit 370 is m+1.

To facilitate printing the partial duration modulation signals, each data value is successively selected by control circuit 245. Modulation signal selection circuit 370 selects a least significant bit of each selected data value until all k least significant bits are transferred, as partial duration modulation signals, along line 380, to print head driver circuit 60. As described previously, the duration of each current pulse is commensurate with the partial pulse bit position from which the partial duration modulation signal is derived. After print head driver circuit 60 prints the dots associated with each logical "1" valued partial duration modulation signal, a second least significant bit is selected as a partial duration modulation signal and printed. The selection is repeated until all the partial pulse bits have had an opportunity to generate a partial current pulse through thermal elements 415. Of course, the order in which the least significant bits are selected is irrelevant.

Subsequent to generating the partial duration modulation signals, the data value comparisons are accomplished, i.e., as described previously, each data value is compared to each one of $2^{(n-m)}-1$ modulation values. The resulting full duration modulation signals are transferred via modulation signal selection circuit 370 to print head driver circuit 60.

More specifically, each series of k modulation signals (a row) is serially transferred, along line 380, to output register 390 in print head driver circuit 60. Upon each occurrence of a "HEADCLK" signal on line 395, each modulation signal on line 380 is transferred into register 390 until k full duration modulation signals are stored therein. Upon the occurrence of the "LATCH" signal appearing on line 396, latch 403 transfers, via lines 400 and 401, the contents of register 390 to drive enable circuit 405. Subsequently, the signals from latch 403 are applied to thermal elements 415, via drive enable circuitry 405, for a duration controlled by the "DRIVE ENABLE" command on line 404. When a modulation signal bit of logical value "1" and the "DRIVE ENABLE" command are coincident to drive enable circuit 405, a current will flow from positive voltage terminal 410 through thermal element 415 to ground for a duration equivalent to the pulse length of the "DRIVE ENABLE" command. The duration of the "DRIVE ENABLE" command corresponds to the type of modulation value currently selected by modulation signal selection circuit 370, i.e., full duration or partial duration modulation signals. During the period of current flow through thermal element 415, the element becomes hot and melts the ink on the ink film (not shown) to form a dot on the recording medium. The foregoing printing process is repeated for each data value until each data value has had an opportunity to produce a partial duration current pulse, a full duration current pulse, or both.

The modulator control signals, namely, "DATA SELECT", "MODULATION VALUE SELECT", "DATA ENABLE", "MODULATION ENABLE", "MODULATION SIGNAL SELECT", "HEADCLK", and "LATCH", are provided by control circuit 245. Typically, control circuit 245 is a gate array which generates the control signals as well as establishing the print head DRIVE ENABLE duration for each full duration current pulse and for each of partial duration current pulse. If the full duration current pulse duration is set to one unit, then, for a system using three partial pulse bits in the least significant bit positions of a data value, the first bit will generate a pulse duration of ½ of a unit, the second bit will generate a pulse duration of ¼ of a unit and the third bit will generate a pulse duration of ⅛ of a unit. Typically, a one unit drive current duration is on the order of 30 microseconds.

A PARTIAL PULSE MODULATION EXAMPLE

The foregoing description described the apparatus used to practice the invention. Now, I will present an explanation of a process through which this apparatus, using both partial and full duration current pulses, produces a complete line of dots. Throughout the following discussion, reference will be made to specific physical components that effectuate the process. Each of these components is depicted in FIG. 2 and has been discussed in detail above.

For the purposes of discussion, I will assume the use of a 9-bit data value, i.e., n+1 bits, having three partial pulse bits in the least significant bit positions of the data value, i.e., n equals eight, m equals two, with the least significant bit not being applied to the comparator. Additionally, to simplify the description, a line is assumed to consist of eight data values, i.e., k equals eight. In contrast and in practice, a line of print would consist of hundreds or thousands of such values.

Figure 4:
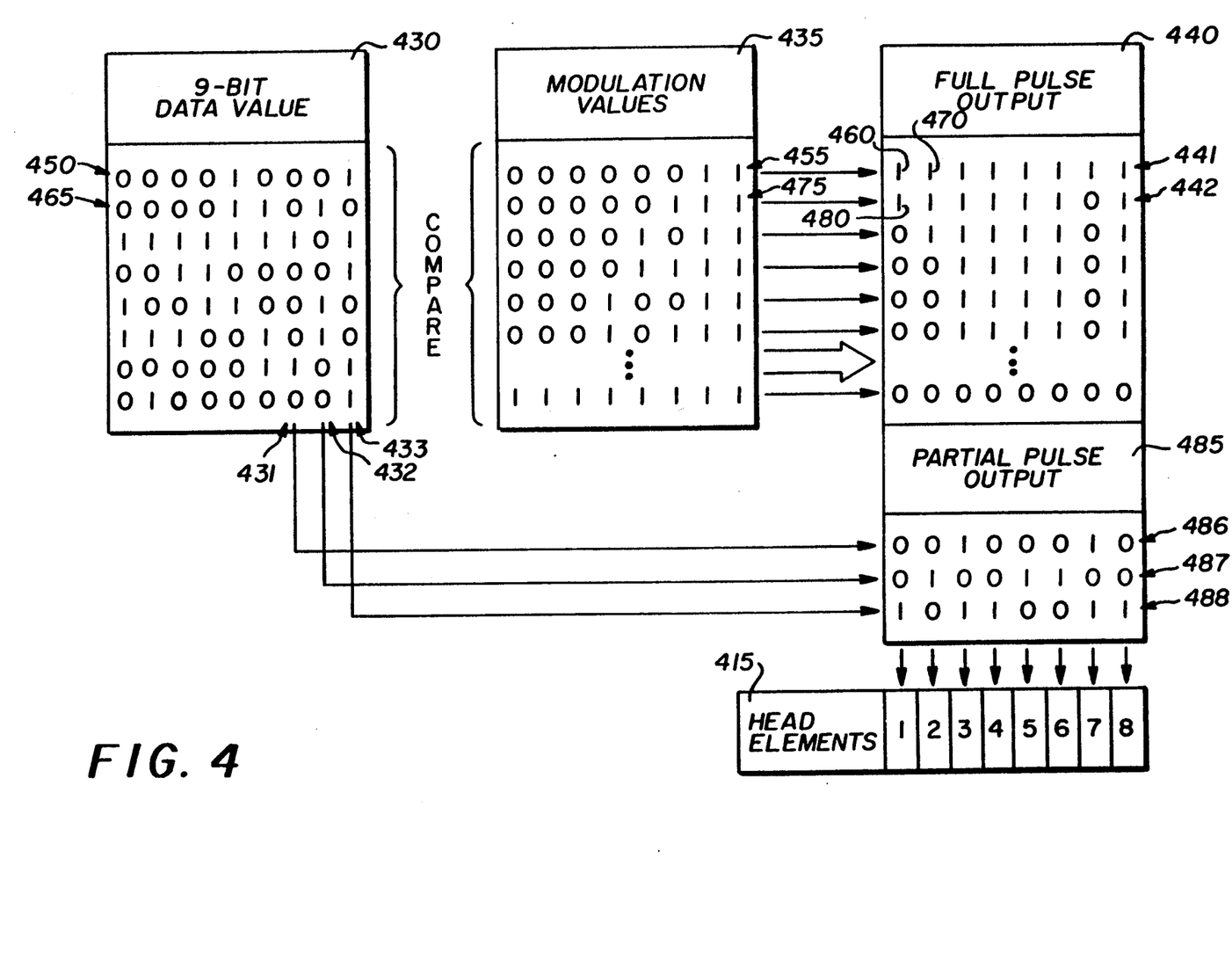
FIG. 4 depicts an illustrative example of the inventive comparison technique.

As depicted in FIG. 4, each data value 430 is processed in two distinct processes to generate full pulse output 440 and partial pulse output 485. First, least significant bits 431, 432, and 433 of each data value 430, that have been designated partial pulse bits, are used to produce corresponding partial duration current pulses. Second, each data value 430 is processed to produce a number of full duration current pulses.

To generate partial duration modulation signals from partial pulse bits, the inventive modulator is commanded by the control circuitry to transfer to the modulation signal selection circuit output the third least significant bit 431 of each data value 430, i.e., the bit in position 2 (the rightmost least significant bit being in position 0). Simultaneously, the "DRIVE ENABLE" duration is set by the control circuit to approximately one-half of a unit. Accordingly, partial pulse output 485, specifically row 486, is generated by successively retrieving each data value 430 and passing each third least significant bit 431 to row 486 of partial pulse output 485, i.e., into output register 390 shown in FIG. 2. After all data values 430 (see FIG. 4) are retrieved and their third least significant bits 431 sequentially stored in the output register, the register is enabled and the partial pulse bits, now partial duration modulation signals, are loaded into the latch. Subsequently, the latch applies the partial duration modulation signals to thermal elements 415, via the drive enable circuit. Each logical "1" in row 486 causes current to flow through its associated thermal element for a duration defined by the "DRIVE ENABLE" signal, i.e., thermal elements 3 and 7 are activated for one-half of a unit.

Next, the control circuit adjusts the "DRIVE ENABLE" signal to be approximately half the duration that was just previously used, i.e., now approximately one-fourth of a unit. Additionally, the modulation signal selection circuit output is connected to the second least significant bit 432, i.e., that in position 1. Each such bit in data values 430 is successively retrieved and the second bit is transferred to the output register via the modulation signal selection circuit. The result is depicted in partial pulse output 485, specifically row 487. Subsequently, the output register contents are applied through the latch and drive enable circuit to thermal elements 415 for a duration defined by the DRIVE ENABLE signal, i.e., thermal elements 2, 5 and 6 are activated for one-quarter of a unit.

Next, the control circuit adjusts the "DRIVE ENABLE" signal to be approximately half the duration that was just previously used, i.e., now approximately one-eighth of a unit. Additionally, the modulation signal selection circuit output is connected to the first least significant bit 433, i.e., that in position 0. Each data value 430 is successively retrieved and the second bit is transferred to the output register via the modulation signal selection circuit. The result is depicted in partial pulse output 485 as row 488. Subsequently, the output register contents are applied through the latch and drive enable circuit to thermal elements 415 for a duration defined by the "DRIVE ENABLE" signal, i.e., thermal elements 1, 3, 4, 7 and 8 are activated for one-eighth of a unit.

Once all the designated partial pulse bits are used to print dots, each data value 430 is processed to accomplish printing of the full duration current pulses as described previously with reference to FIG. 3. For the example in FIG. 4, an 8-bit data value 430, i.e., ignoring the least significant bit, with two partial pulse bits are applied to the comparator, the stored modulation values start at 3, i.e., $2^m-1$, and are incremented by 4, i.e., $2^m$.

Specifically, first data value 450 is selected from the data storage device having an illustrative value of 00001000, i.e., eight. For this example, least significant bit 433 is not compared to any of the modulation values; therefore, during the comparison this bit is ignored, i.e., an n+1 bit data value is compared to an n-bit modulation value.

First data value 450 is compared to first modulation value 455 having a value of 00000011, i.e., three. Since data value 450 is greater than modulation value 455, a logical "1" is sent through the modulation signal selection circuit to the output register. The value is shown in output 440 and the particular value, which now forms the most significant bit within row 441, is indicated by reference number 460. Similarly, second data value 465 is compared to first modulation value 455 and the result is stored in the output register as the second most significant bit in row 441, as indicated by reference number 470. The process repeats until all eight data values 430 are compared to first modulation value 455 and the results are stored in the output shift register as outputs 440, thereby completely forming row 441. Subsequently, the eight output values in row 441 are latched and used to send a current pulse having a duration of one unit through each of the eight thermal elements for each bit stored in the output register having a value of logical "1".

Subsequently, first data value 450 is again retrieved and compared to second modulation value 475 having a value of 00000111, i.e., seven. The result of the comparison is stored in the output shift register as output bit 480. The comparison process is repeated until all data values 430 are compared to second modulation value 475 and the results are stored in the output shift register as indicated in row 442 of output 440. The eight output values are then latched, applied to the thermal element driver circuitry, and printed as dots.

The process is repeated until each of eight data values 430 have been compared to each of sixty-three modulation values 435, i.e., ranging from 3 to 255 in increments of 4. Repetitively, the results of the comparison are applied to the thermal element driver circuitry to pass current through each thermal element 415 whenever output value 440 is a logical "1".

The illustrative example using partial pulse modulation generates a 512 level gray scale image by comparing each data value to 63 modulation values, using three partial pulse bits. To achieve 512 levels, the repetitively applied output pulse durations range from zero to 63 units in increments of one-eighth of a unit. For example, output signals 440 and 485 drive the first thermal element two and one-eighth pulse durations, the second thermal element three and one-quarter and so on. Consequently, a dot whose size is commensurate with the cumulative current pulse duration is printed at each thermal element location.

Thus, a 512 gray level print head modulator is achieved using approximately one-fourth of the processing iterations used in a conventional PCM modulator, i.e., 511 comparisons for conventional PCM. As a direct result of a decrease in necessary processing iterations, the print speed is advantageously increased over the conventional thermal print modulators using conventional PCM. Advantageously, the inventive modulator can utilize the enhanced speed of partial pulse modulation or, if necessary for a particular application, utilize conventional PCM.

Of course, the inventive modulator can be altered to accommodate more than n+1 data value bits used in the preferred embodiment by expanding the data handling capabilities of the data value register and modulation signal selection circuit. All the bits in excess of n are designated partial pulse bits, thus no alterations to the modulation value table would be necessary since only an n-bit comparison is accomplished for each data value. Additionally, a modulator designed to handle more than n bits can also be used in conjunction with any number of data value bits between the maximum number of bits the modulator can utilize and n bits. Any unused data value bit positions are merely assigned a zero value while the modulation value table remains unaltered to accommodate n data value bits. For example, modulator 300 of FIG. 2 can accommodate a maximum of n+1 data value bits and a minimum of n data value bits. Therefore, if a 9-bit system is used with 8-bit data values, the most significant bit of each 8-bit data value is deemed a zero to enable the 9-bit modulator to handle 8-bit data values.

In accordance with an alternative embodiment of the present invention, look-up table 235 containing modulation values, that are selectable, in any order, by control circuitry 245, is incorporated into thermal print head modulator 300. Look-up table 235 contains all the modulation values necessary to accomplish pulse count modulation. Thus, when pulse count modulation is desired, each and every modulation value is selected from the table for comparison to each data value. The result of each comparison is used as a modulation signal to drive thermal print head 135 for a fixed duration. However, when modulator 300 is to be used as a partial pulse modulator, the capability to select modulation values in any order from the table enables the modulator to choose a select number of modulation values from table 235, without reprogramming table 235 with new modulation values, for comparison to PCM bits within each data value. As is necessary for conventional PCM, table 235 contains modulation values ranging from 0 to $2^n-2$ in increments of 1. Control circuit 245 selects for comparison to each data value those values beginning with value $2^m-1$ and thereafter continuing with values in increments of $2^m$. The result of the PCM bit comparison generates a modulation signal for driving print head 135 with full duration current pulses, while a number of partial pulse bits are separately used as modulation signals for generating partial duration current pulses. Therefore, modulator of this alternative embodiment can be used, without alteration, with any number of partial pulse bits, or none at all.

Although two embodiments of the present invention have been shown and described herein, many other varied embodiments that incorporate the teachings of the invention may be easily constructed by those skilled in the art.

I claim:

1. Apparatus for modulating a thermal element drive pulse applied to a thermal element (415) of a thermal printer (100) to generate a dot (145) whose size corresponds to a data value (205) represented by a first plurality of bits, said apparatus comprising:
    means (245) for designating a bit at a location within said first plurality of bits of said data value as a partial pulse bit;
    a look-up table (235) containing a plurality of modulation values (236), each of said modulation values (236) having a second plurality of bits;
    means (245) for selecting a modulation value from said look-up table;
    means (225) for comparing said data value to said selected modulation value and for generating a first signal as an output signal if said data value is greater than said selected modulation value and for generating a second signal as an output signal if said data value is less than or equal to said modulation value;
    means (370) for selecting, as a modulation signal, said output signal of said comparing means or said partial pulse bit;
    means (245) for determining a duration for said thermal element drive pulse corresponding to said modulation signal; and
    means (405) for applying said thermal element drive pulse to a thermal element for said duration whereby said thermal element is activated for said duration.

2. The apparatus of claim 1 wherein said modulation value selecting means selects a modulation value having a bit fixed to a logical "1" value corresponding to said location within said plurality of bits of said data value of said partial pulse bit in said data value.

3. The apparatus of claim 2 wherein said modulation signal selecting means successively selects said partial pulse bit and said output signal and wherein said duration determining means determines a duration of said thermal element drive pulse as one unit in duration when said output signal is selected as the modulation signal and as a fraction of one unit in duration when said partial pulse bit is selected as the modulation signal.

4. The apparatus of claim 1 wherein said designating means designates none of said data value bits as a partial pulse bit.

5. The apparatus of claim 1 further comprising:
    means (245) for repetitively selecting a series of modulation values of increasing value and for repetitively engaging said comparing means, said modulation signal selecting means and said applying means for each of said selected selected modulation values until all said selected modulation values in said series have been compared to said data value.

6. The apparatus of claim 5 further comprising:
    data value selecting means (245) for selecting said data value from a plurality of data values; and
    means (245) for repetitively applying said repetitively selecting and engaging means for each said selected data value whereby an entire image is thermally printed.

7. The apparatus of claim 1 wherein said partial pulse bit is a least significant bit of said data value.

8. A method for modulating a thermal element drive pulse applied to a thermal element of a thermal printer to generate a dot whose size corresponds to a data value represented by a first plurality of bits, said method comprising the steps of:
    designating a bit at a location within said first plurality of bits of said data value as a partial pulse bit;
    selecting a modulation value from a look-up table containing a plurality of modulation values, each of said modulation values having a second plurality of bits;
    comparing said data value to said selected modulation value and generating, as an output signal, a first signal if said data value is greater than said selected modulation value or a second signal if said data value is less than or equal to said modulation value;
    selecting as a modulation signal either said output signal of said comparing step or said partial pulse bit;
    determining a duration of said thermal element drive pulse corresponding to said modulation signal; and
    applying said modulation signal to said thermal element for said duration whereby said thermal element is activated for said duration.

9. The method of claim 8 further comprising the steps of:
    repetitively increasing said modulation value to produce a series of modulation values; and
    repetitively applying the steps of comparing said selected modulation value to said data value, selecting said modulation signal and applying said modulation signal, for each of said selected modulation values in said series of modulation values until all said selected modulation values in said series of modulation values have been compared to said data value.

10. The method of claim 9 further comprising the steps of:
   selecting said data value from a plurality of data values; and
   repetitively applying said repetitively increasing and applying steps for each said selected data value whereby an entire image is thermally printed.

11. The apparatus of claim 8 wherein said designating means designates none of said data value bits as a partial pulse bit.

12. The method of claim 8 wherein said modulation value selecting step further comprises the step of selecting a modulation value having a bit fixed to a logical "1" value corresponding to said location within said plurality of bits of said data value of said partial pulse bit in said data value.

13. The method of claim 8 wherein said partial pulse bit is a least significant bit of said data value.

14. The method of claim 8 wherein said modulation signal selecting step includes a step of successively selecting said partial pulse bit and said output signal and wherein said duration determining step further comprises the step of determining a duration of said thermal element drive pulse as one unit in duration when said output signal is selected as the modulation signal and as a fraction of one unit in duration when said partial pulse bit is selected as the modulation signal.

* * * * *